US008479254B2

(12) United States Patent
Buss et al.

(10) Patent No.: US 8,479,254 B2
(45) Date of Patent: Jul. 2, 2013

(54) CREDENTIAL CATEGORIZATION

(75) Inventors: Duane F. Buss, West Mountain, UT (US); Patrick R. Felsted, Cedar Hills, UT (US); Andrew A. Hodgkinson, Pleasant Grove, UT (US); Daniel S. Sanders, Orem, UT (US)

(73) Assignee: Apple Inc., Cupertino, CA (US)

( * ) Notice: Subject to any disclaimer, the term of this patent is extended or adjusted under 35 U.S.C. 154(b) by 1239 days.

(21) Appl. No.: 11/843,591

(22) Filed: Aug. 22, 2007

(65) Prior Publication Data

US 2008/0229383 A1 Sep. 18, 2008

Related U.S. Application Data

(63) Continuation-in-part of application No. 12/323,141, filed on Nov. 25, 2008.

(60) Provisional application No. 60/895,312, filed on Mar. 16, 2007, provisional application No. 60/895,316, filed on Mar. 16, 2007, provisional application No. 60/895,325, filed on Mar. 16, 2007.

(51) Int. Cl.
*G06F 17/00* (2006.01)

(52) U.S. Cl.
USPC .......... 726/1

(58) Field of Classification Search
USPC .......... 726/9, 20, 1, 4, 17, 27–30
See application file for complete search history.

(56) References Cited

U.S. PATENT DOCUMENTS

| | | | |
|---|---|---|---|
| 3,614,839 | A | 10/1971 | Thomas |
| 3,949,501 | A | 4/1976 | Andrews et al. |
| 4,153,931 | A | 5/1979 | Green et al. |
| 4,568,403 | A | 2/1986 | Egan |
| 4,730,848 | A | 3/1988 | McCormick |
| 5,073,950 | A | 12/1991 | Colbert et al. |
| 5,485,510 | A | 1/1996 | Colbert |
| 5,546,471 | A | 8/1996 | Merjanian |
| 5,546,523 | A | 8/1996 | Gatto |
| 5,594,806 | A | 1/1997 | Colbert |
| 5,613,012 | A | 3/1997 | Hoffman et al. |
| 5,848,412 | A | 12/1998 | Rowland et al. |
| 6,028,950 | A | 2/2000 | Merjanian |

(Continued)

FOREIGN PATENT DOCUMENTS

| | | |
|---|---|---|
| EP | 0917120 | 5/1999 |
| JP | 11003382 | 1/1999 |
| JP | 11039540 | 2/1999 |
| JP | 11154260 | 6/1999 |
| WO | WO98/23062 | 5/1998 |
| WO | WO2008/088945 | 7/2008 |

OTHER PUBLICATIONS

Computer Security Institute; "What InfoCard Is and Isn't"; May 2006, 4 pages.*

(Continued)

*Primary Examiner* — Beemnet Dada
(74) *Attorney, Agent, or Firm* — Blakely, Sokoloff, Taylor & Zafman LLP

(57) ABSTRACT

The user can associate metadata with information cards. The metadata can include, among other possibilities, string names, icons, user policies, containers, and hierarchies. The metadata is stored by the computer system. The metadata can then be used to filter the set of information cards that can satisfy a security policy from a relying party.

31 Claims, 8 Drawing Sheets

U.S. PATENT DOCUMENTS 6,055,595 A 4/2000 Tachibana et al.
6,327,578 B1 12/2001 Linehan
6,363,488 B1 3/2002 Ginter et al.
6,481,621 B1 11/2002 Herrendoerfer et al.
6,513,721 B1 2/2003 Salmre et al.
6,612,488 B2 9/2003 Suzuki
6,721,713 B1* 4/2004 Guheen et al. ................ 705/1.1
6,880,155 B2 4/2005 Schwabe et al.
6,913,194 B2 7/2005 Suzuki
6,970,836 B1 11/2005 Paltenghe et al.
7,003,501 B2 2/2006 Ostroff
7,103,575 B1* 9/2006 Linehan .......................... 705/64
7,104,444 B2 9/2006 Suzuki
7,210,620 B2 5/2007 Jones
7,225,156 B2 5/2007 Fisher et al.
7,231,369 B2 6/2007 Hirabayashi
7,343,351 B1 3/2008 Bishop et al.
7,353,532 B2 4/2008 Duri et al.
7,360,237 B2 4/2008 Engle et al.
7,416,486 B2 8/2008 Walker et al.
7,444,519 B2 10/2008 Laferriere et al.
7,487,920 B2 2/2009 Sato et al.
7,494,416 B2 2/2009 Walker et al.
7,500,607 B2 3/2009 Williams
7,529,698 B2 5/2009 Joao
7,537,152 B2 5/2009 Chakiris et al.
RE40,753 E 6/2009 Wang et al.
7,555,460 B1 6/2009 Barkan
7,565,329 B2 7/2009 Lapsley et al.
7,591,424 B2 9/2009 Wang et al.
7,594,258 B2 9/2009 Mao et al.
7,610,040 B2 10/2009 Cantini et al.
7,613,659 B1 11/2009 Hoffman et al.
7,620,177 B2 11/2009 Ibrahim et al.
7,636,941 B2 12/2009 Blinn et al.
7,661,585 B2 2/2010 Joao
7,664,022 B2 2/2010 Hu
7,747,540 B2 6/2010 Cameron et al.
7,771,273 B2 8/2010 Walker et al.
7,788,499 B2 8/2010 Cameron et al.
7,797,413 B2 9/2010 Adelman et al.
7,797,434 B2 9/2010 Blakley et al.
7,831,522 B1 11/2010 Satish et al.
7,860,883 B2 12/2010 Hinton et al.
2001/0007983 A1 7/2001 Lee
2002/0026397 A1 2/2002 Ieta et al.
2002/0029337 A1 3/2002 Sudia et al.
2002/0029342 A1 3/2002 Keech
2002/0046041 A1 4/2002 Lang
2002/0095360 A1 7/2002 Joao
2002/0103801 A1 8/2002 Lyons
2002/0106065 A1* 8/2002 Joyce et al. .............. 379/114.02
2002/0116647 A1 8/2002 Mont et al.
2002/0178370 A1 11/2002 Gurevich et al.
2003/0061170 A1 3/2003 Uzo
2003/0126094 A1 7/2003 Fisher et al.
2003/0158960 A1* 8/2003 Engberg ........................ 709/237
2003/0172090 A1 9/2003 Asunmaa et al.
2003/0217140 A1 11/2003 Burbeck et al.
2003/0218062 A1 11/2003 Noriega et al.
2004/0019571 A1 1/2004 Hurwitz et al.
2004/0034440 A1 2/2004 Middlebrook
2004/0128392 A1 7/2004 Blakley et al.
2004/0162786 A1 8/2004 Cross et al.
2004/0199475 A1 10/2004 Rivest et al.
2004/0199787 A1 10/2004 Hans et al.
2004/0230831 A1 11/2004 Spelman et al.
2005/0033692 A1 2/2005 Jarman et al.
2005/0044423 A1 2/2005 Mellmer et al.
2005/0091543 A1 4/2005 Holtzman et al.
2005/0097550 A1 5/2005 Schwabe et al.
2005/0124320 A1 6/2005 Ernst et al.
2005/0135240 A1 6/2005 Ozugur
2005/0229005 A1 10/2005 Le Saint et al.
2005/0247777 A1 11/2005 Pitroda
2005/0247797 A1 11/2005 Ramachandran
2005/0289080 A1 12/2005 Rhiando
2006/0136990 A1 6/2006 Hinton et al.
2006/0200424 A1 9/2006 Cameron et al.
2006/0206931 A1 9/2006 Dillaway et al.
2006/0224611 A1 10/2006 Dunn et al.
2006/0235796 A1 10/2006 Johnson et al.
2007/0016484 A1 1/2007 Waters et al.
2007/0016943 A1 1/2007 M'Raihl et al.
2007/0043651 A1 2/2007 Xiao et al.
2007/0061567 A1 3/2007 Day et al.
2007/0118449 A1 5/2007 De La Motte
2007/0143835 A1 6/2007 Cameron et al.
2007/0192245 A1 8/2007 Fisher et al.
2007/0203852 A1 8/2007 Cameron et al.
2007/0204168 A1 8/2007 Cameron et al.
2007/0204325 A1 8/2007 Cameron et al.
2007/0208869 A1 9/2007 Adelman et al.
2007/0208940 A1 9/2007 Adelman et al.
2007/0214079 A1 9/2007 Mears
2007/0214429 A1 9/2007 Lyudovyk et al.
2007/0282951 A1 12/2007 Selimis et al.
2007/0294431 A1 12/2007 Adelman et al.
2008/0003977 A1 1/2008 Chakiris et al.
2008/0010675 A1 1/2008 Massascusa et al.
2008/0071808 A1 3/2008 Hardt et al.
2008/0098228 A1 4/2008 Anderson et al.
2008/0140576 A1 6/2008 Lewis et al.
2008/0141366 A1 6/2008 Cross et al.
2008/0162297 A1 7/2008 Hershkovitz et al.
2008/0178271 A1 7/2008 Galjjala et al.
2008/0178272 A1 7/2008 Gajjala et al.
2008/0184339 A1 7/2008 Shewchuk et al.
2008/0189778 A1 8/2008 Rowley
2008/0196096 A1 8/2008 Grynberg
2008/0222714 A1 9/2008 Wahl
2008/0229410 A1 9/2008 Felsted et al.
2008/0235144 A1 9/2008 Phillips
2008/0244722 A1 10/2008 Satish et al.
2008/0256594 A1 10/2008 Satish et al.
2008/0263644 A1 10/2008 Grinstein
2008/0289020 A1 11/2008 Cameron et al.
2008/0301784 A1 12/2008 Zhu et al.
2008/0313567 A1 12/2008 Sabin et al.
2009/0013391 A1 1/2009 Ernst
2009/0037920 A1 2/2009 Brown et al.
2009/0077118 A1 3/2009 Doman et al.
2009/0077627 A1 3/2009 Doman et al.
2009/0089625 A1 4/2009 Kannappan et al.
2009/0089870 A1 4/2009 Wahl
2009/0089871 A1 4/2009 Murphy et al.
2009/0099860 A1 4/2009 Karabulut et al.
2009/0125558 A1 5/2009 Suh
2009/0131157 A1 5/2009 Hedrick et al.
2009/0138398 A1 5/2009 Cole et al.
2009/0178112 A1 7/2009 Doman et al.
2009/0186701 A1 7/2009 Rowe et al.
2009/0199284 A1 8/2009 Sanders et al.
2009/0204622 A1 8/2009 Sanders et al.
2009/0205014 A1 8/2009 Doman et al.
2009/0205035 A1 8/2009 Semersheim et al.
2009/0216666 A1 8/2009 Antao et al.
2009/0241178 A1 9/2009 Burch et al.
2009/0249430 A1 10/2009 Buss et al.
2009/0251749 A1 10/2009 O'Boyle et al.
2009/0254476 A1 10/2009 Sharma et al.
2009/0254483 A1 10/2009 Barkan
2009/0260064 A1 10/2009 McDowell et al.
2009/0300512 A1 12/2009 Ahn
2009/0300747 A1 12/2009 Ahn
2009/0320095 A1 12/2009 Nanda et al.
2009/0328166 A1 12/2009 Burch et al.
2010/0037303 A1 2/2010 Sharif et al.
2010/0274691 A1 10/2010 Hammad et al.
2011/0023103 A1 1/2011 Dietrich et al.

OTHER PUBLICATIONS

Microsoft Corporation, "Microsofts Vision for an Identity Metasystem" http://msdn.microsoft.com/en-us/library/ms996422.aspx. May 2005.*

Cameron, Kim, and Jones, M.B. Design Rationale behind the identity metasystem architecture, Feb. 2006. Microsoft Corporation.*
Computer Security Institute; "What InfoCard Is and Isn't"; http://web.archive.org/web/20060423133 805/http:/www.identityblog.com/wp-content/resources/alert.pdf, May 2006 (4 pages).
Cameron, Kim et al; "Design Rationale behind the Identity Metasystem Architecture"; http://www.identityblog.com/, http://research.microsoft.com/~mbj/; Mar. 16, 2006, pp. 1-11.
Hoang et al.; "Secure Roaming with Identity Metasystems"; ACM 978-1-60558-006-1; http://portal.acm.org/citation.cfm?id=1373297; 2008, pp. 36-47.
"The Resource STS: R-STS, RP-STS, A-STS . . . the other face of token issuing"; Vibro.NET; http://209.85.175.104/search?q=cache:mFlf-sZFBLsJ:blogs.msdn.comlvbertocci/arch ive/2007/09/24/the-resource-sts-r-sts-rp-sts-a-sts-the- other-face-of-token-issuing.aspx+microsoft+age+STS+RP&hl=en&ct=clnk&cd=2&gl=us&client=firefox-a; MSDN Blogs; 2007, pp. 1-7.
"Identity Selector Interoperability Profile specification and companion guides"; Microsoft Download Center; http://www.microsoft.com/downloads/details.aspx?DisplayLang=en &FamilyID=b94817fc-3991-4ddO-8e85-b73e626f6764; Microsoft Corporation; 2007.
Nanda, Arun; Identity Selector Interoperability Profile V1.0; Microsoft Download Center, http://download.microsoft. com/download/1/1/a/11 ac6505-e4cO-4e05-987c-6f1 d31855cd2/Identity-Selector-Interop-Profile-v1 .pdf; Microsoft Corporation; Apr. 2007, pp. 1-52.
Microsoft Corporation, Ping Identity Corporation, "An Implementer's Guide to the Identity Selector Interoperability Profile V1.0"; Microsoft Download Center, http://download.microsoft.com/download/1/1/a/11ac6505-e4cO-4e05-987c-6f1d31855cd2/Identity-Selector-Interop-Profile-v1-Guide.pdf; Microsoft Corporation; Apr. 2007, pp. 1-74.
Jones, Michael B.; "A Guide to Using the Indentity Selector interoperability Profile V1.0 within Web Applications and Browsers"; Microsoft Download Center; http://download.microsoft.com/download/1/1/a/11ac6505-e4cO-4e05-987c-6f1 d31855cd2/Identity-Selector-Interop-Profile-v1-Web-Guide.pdf; Microsoft Corporation; Apr. 2007, pp. 1-14.
Jones, Michael B., "Michael B. Jones Homepage"; http://research.microsoft.com/en-us/um-people/mbj; Aug. 12, 2009, pp. 1-4.
Jones, Michael B., "Mike Jones: self-issued"; http://research.microsoft.com/en-us/um-people/mbj; Aug. 12, 2009, pp. 1-45.
Just, Mike; "Designing Authentication Systems with Challenge Questions"; Security and Usability, Lorrie Faith Cranor and Simson Garfinkel (eds.); O'Reilly Media, Inc., Sebastopol, CA; Aug. 5, 2005; Chapter 8, pp. 147-160.
"PwdHash From Stanford—Generate Passwords by Hashing the URL"; Don't Learn to Hack—Hack to Learn, http://www.darknet.org.uk/2007/03/pwdhash-from-stanford-generate; Darknet; Mar. 13, 2007, pp. 1-8.
"Microsoft's Vision for an Identity Metasystem"; http://www.identityblog.com/stories/2005/07/05/IdentityMetasystem.htm; Microsoft Corporation; May 2005, pp. 1-10.
Gnucitizen, "Attacking Password Recovery Facilities"; http://www/gnucitizen.org/blog/attacking-password-recovery-facilities; Jul. 6, 2007, pp. 1-4.
Sol, S., "The Display (GUI) Layer" Intro to the Web Application Development Environment, http://web.archive.org/web/20001119171800/http://extropia.com/tutorials/devenv/gui.html>, Nov. 19, 2000, pp. 1-10, XP002517142.
Cambridge, "Cambridge Dictionary Online", Internet Article, http://dictionary.cambridge.org/define.asp?key=11419&dict=CALD>, Feb. 26, 2009, XP002517143.
Harjanto, A., "InfoCard and Browser Integration", Internet Article, http://blogs.msdn.com/andyhar/archive/2006/02/20/535333.aspx>, Feb. 20, 2006, XP002517147.
Dingle, P., "Identity Selectors & Browser Detection", Internet Article, http://eternallyoptimistic.com/2006/11/05/identity-selectors-browser-detection/>, Nov. 5, 2006, XP002517148.
Techtree News Staff, "Infocard Spells End of Passwords", Internet Article, http://www.techtree.com/techtree/jsp/article.jsp?print=1 &article_id=71396&cat_id=582>, Feb. 16, 2006, XP002517144.
Tewfiq El Maliki et al.; A Survey of User-centric Identity Management Technologies; Emerging Security Information Systems, and Technologies, 2007, pp. 12-17.
Sanders, T., "IBM/Novell unveil rival to Microsoft Infocard", Internet Article, http://www.vnunet.com/articles/print/2151060>, Feb. 26, 2006, XP002517145.
Cameron, K., "Bill Gates, Inforcards and the Identity Metasystem", Internet Article, http://www.identityblog.com/?p=374>, Feb. 19, 2006, XP002517146.
Darknet (2007), "Don't Learn to Hack—Hack to Learn". Retrieved from http://www.darknet.org.uk/2007/03/pwdhash-from-stanford-generate-passwords-by-hashing-the-url, pp. 1-7.
Allan, A. (2003), "Best Practices for Managing Passwords: Self-Service Q&A". Published by Garner, Inc. at Tutorials, TU-20-2040, pp. 1-5.
Microsoft Corporation, Ping Identity Corporation (Aug. 2005), "A Guide to Integrating with InfoCard v1.0", XP007908505, pp. 1-62.
David Chappell, "Introducing Windows CardSpace", Windows Vista Technical Articles, http://msdn2.microsoft.com/en-us/library/aa480189(d=printer).aspx, Apr. 2006, pp. 1-13.
The Higgins Foundation, "Higgins FAQ", http://www.eclipse.org/higgins/faq.php, printed Aug. 13, 2007, pp. 1-2.
"Components—Eclipsepedia", http://wiki.eclipse.org/Components, printed Aug. 13, 2007, pp. 1-8.
"Architecture—Eclipsepedia", http://wiki.eclipse.org/index.php/Architecture, printed Aug. 13, 2007, pp. 1-2.
U.S. Appl. No. 11/395,725, filed Mar. 31, 2006, entitled "Methods and Systems for Multi-Factor Authentication". This is a commonly owned application that is in the same general field as the invention.
Gralla, Preston; "How the Internet Works"; Millennium Ed. Que, Aug. 1999.
Nagarkar, V., "How to Drag Drop in javascript (Part I)", Internet Article, http://www.codeproject.com/KB/scripting/DragDrip_Part_1_.aspx, Jun. 11, 2006 (12 pages).
Alrodhan, et al., "Addressing privacy issues in CardSpace", 2007, IEEE, pp. 285-291.

* cited by examiner

CREDENTIAL CATEGORIZATION

RELATED APPLICATION DATA

This patent application is a continuation-in-part of co-pending U.S. patent application Ser. No. 12/323,141, filed Nov. 25, 2008, of co-pending U.S. patent application Ser. No. 12/323,177, filed, Nov. 25, 2008, and of co-pending U.S. patent application Ser. No. 12/402,782, filed Mar. 12, 2009, all of which claim the benefit of U.S. Provisional Patent Application Ser. No. 60/895,312, filed Mar. 16, 2007, of U.S. Provisional Patent Application Ser. No. 60/895,316, filed Mar. 16, 2007, and U.S. Provisional Patent Application Ser. No. 60/895,325, filed Mar. 16, 2007, all of which are incorporated herein for all purposes.

FIELD OF THE INVENTION

This invention pertains to performing on-line transactions, and more particularly to managing information cards used in performing on-line transactions.

BACKGROUND OF THE INVENTION

When a user interacts with sites on the Internet (hereafter referred to as "service providers" or "relying parties"), the service provider often expects to know something about the user that is requesting the services of the provider. The typical approach for a service provider is to require the user to log into or authenticate to the service provider's computer system. But this approach, while satisfactory for the service provider, is less than ideal to the user. First, the user must remember a username and password for each service provider who expects such information. Given that different computer systems impose different requirements, and the possibility that another user might have chosen the same username, the user might be unable to use the same username/password combination on each such computer system. (There is also the related problem that if the user uses the same username/password combination on multiple computer systems, someone who hacks one such computer system would be able to access other such computer systems.) Second, the user has no control over how the service provider uses the information it stores. If the service provider uses the stored information in a way the user does not want, the user has relatively little ability to prevent such abuse, or recourse after the fact.

To address this problem, new systems have been developed that allow the user a measure of control over the information stored about the user. Windows CardSpace™ (sometimes called CardSpace) is a Microsoft implementation of an identity meta-system that offers a solution to this problem. (Microsoft, Windows, and CardSpace are either registered trademarks or trademarks of Microsoft Corporation in the United States and/or other countries.) A user can store identity information with an identity provider the user trusts. When a service provider wants some information about the user, the user can control the release of information stored with the identity provider to the service provider. The user can then use the offered services that required the identity information.

But even with new systems such as Microsoft Windows CardSpace, the concern exists that information cards can increase in numbers to levels difficult to manage. A single card store might include any number of cards that could be accepted by a single relying party—for example, if the card store is shared among a number of users, as might occur on a family computer. In addition, a single user might have a number of information cards, issued by different issuers—such as federal and state agencies and private organizations (e.g., Visa)—all of which could be accepted by any number of different relying parties.

A need remains for a way to provide users with the ability to manage their information cards in accordance with user preferences that addresses these and other problems associated with the prior art.

SUMMARY OF THE INVENTION

In an embodiment of the invention, a machine stores at least one information card. Associated with the information card is metadata. This metadata can be used to manage the information cards stored on the machine.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
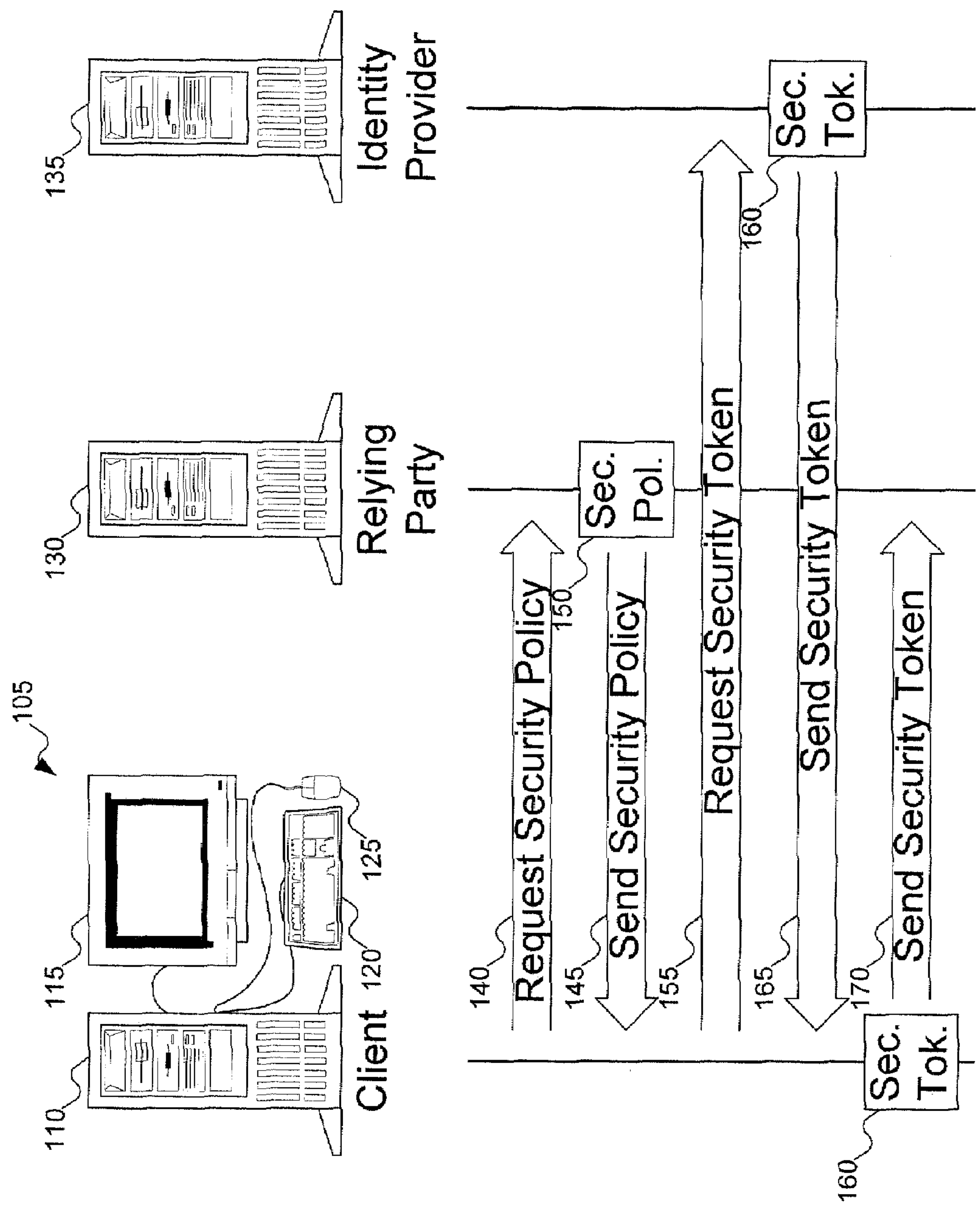
FIG. 1 shows a sequence of communications between a client, a relying party, and an identity provider.

Before explaining the invention, it is important to understand the context of the invention. FIG. 1 shows a sequence of communications between a client, a relying party, and an identity provider. For simplicity, each party (the client, the relying party, and the identity provider) may be referred to by their machines. Actions attributed to each party are taken by that party's machine, except where the context indicates the actions are taken by the actual party.

In FIG. 1, computer system 105, the client, is shown as including computer 110, monitor 115, keyboard 120, and mouse 125. A person skilled in the art will recognize that other components can be included with computer system 105: for example, other input/output devices, such as a printer. In addition, FIG. 1 does not show some of the conventional internal components of computer system 105; for example, a central processing unit, memory, storage, etc. Although not shown in FIG. 1, a person skilled in the art will recognize that computer system 105 can interact with other computer systems, such as relying party 130 and identity provider 135, either directly or over a network (not shown) of any type. Finally, although FIG. 1 shows computer system 105 as a conventional desktop computer, a person skilled in the art will recognize that computer system 105 can be any type of machine or computing device capable of providing the services attributed herein to computer system 105, including, for example, a laptop computer, a personal digital assistant (PDA), or a cellular telephone.

Relying party 130 is a machine managed by a party that relies in some way on the identity of the user of computer system 105. The operator of relying party 130 can be any type of relying party. For example, the operator of relying party 130 can be a merchant running a business on a website. Or, the operator of relying party 130 can be an entity that offers assistance on some matter to registered parties. Relying party 130 is so named because it relies on establishing some identifying information about the user.

Identity provider 135, on the other hand, is managed by a party responsible for providing identity information (or other such information) about the user for consumption by the relying party. Depending on the type of information identity provider 135 stores for a user, a single user might store identifying information with a number of different identity providers 135, any of which might be able to satisfy the request of the relying party. For example, identity provider 135 might be a governmental agency, responsible for storing information generated by the government, such as a driver's license number or a social security number. Or, identity provider 135 might be a third party that is in the business of managing identity information on behalf of users.

The conventional methodology of releasing identity information can be found in a number of sources. One such source is Microsoft Corporation, which has published a document entitled Introducing Windows CardSpace, which can be found on the World Wide Web at http://msdn2.microsoft.com/en-us/library/aa480189.aspx and is hereby incorporated by reference. To summarize the operation of Windows CardSpace, when a user wants to access some data from relying party 130, computer system 105 requests the security policy of relying party 130, as shown in communication 140, which is returned in communication 145 as security policy 150. Security policy 150 is a summary of the information relying party 130 needs, how the information should be formatted, and so on.

Once computer system 105 has security policy 150, computer system 105 can identify which information cards will satisfy security policy 150. Different security policies might result in different information cards being usable. For example, if relying party 130 simply needs a username and password combination, the information cards that will satisfy this security policy will be different from the information cards that satisfy a security policy requesting the user's full name, mailing address, and social security number. The user can then select an information card that satisfies security policy 150.

Once the user has selected an acceptable information card, computer system 105 uses the selected information card to transmit a request for a security token from identity provider 135, as shown in communication 155. This request can identify the data to be included in the security token, the credential that identifies the user, and other data the identity provider needs to generate the security token. Identity provider 135 returns security token 160, as shown in communication 165. Security token 160 includes a number of claims, or pieces of information, that include the data the user wants to release to the relying party. Security token 160 is usually encrypted in some manner, and perhaps signed and/or time-stamped by identity provider 135, so that relying party 130 can be certain that the security token originated with identity provider 135 (as opposed to being spoofed by someone intent on defrauding relying party 130). Computer system 105 then forwards security token 160 to relying party 130, as shown in communication 170.

In addition, the selected information card can be a self-issued information card: that is, an information card issued not by an identity provider, but by computer system 105 itself. In that case, identity provider 135 effectively becomes part of computer system 105.

In this model, a person skilled in the art will recognize that because all information flows through computer system 105, the user has a measure of control over the release of the user's identity information. Relying party 130 only receives the information the user wants relying party 130 to have, and does not store that information on behalf of the user (although it would be possible for relying party 130 to store the information in security token 160: there is no effective way to prevent such an act).

The problem with this model is, as noted above, that the system identifies all information card(s) that can be used to satisfy the needs of the relying party. Even with computer system 105 identifying only information cards that satisfy security policy 150, there might be still be a large number of information cards to consider.

This problem exists even for a single user: as discussed above, a user might have a number of information cards issued by federal or state agencies and private organizations, many of which might satisfy security policy 150. Thus, the user would need to select which information card to use in dealings with relying party 130. This problem can be compounded when the user has multiple identities—not in the sense of fraudulent identities, but in the sense of different mindsets. For example, a user might have some information cards used when the user is working, another set of information cards for personal use, a third set of information cards for use when gaming, and so on.

The picture can get even more complicated when multiple users use the same computer. For example, if a family shares a computer, all the information cards can be stored in a single card store. Because parents might want to have some control over their children's activities, parents may want to be able to review their children's information cards. Or parents might want to be able to apply policies to limit their children's use of their information cards.

Another situation in which information card management becomes more complicated occurs where one user needs to proxy for another user. For example, an administrator might need to be able to act on behalf of a user. Or a financial planner might need to be able to act on behalf of client (for example, to electronically file a tax return). In these situations, being able to manage information cards can simplify the use of information cards.

Figure 2:
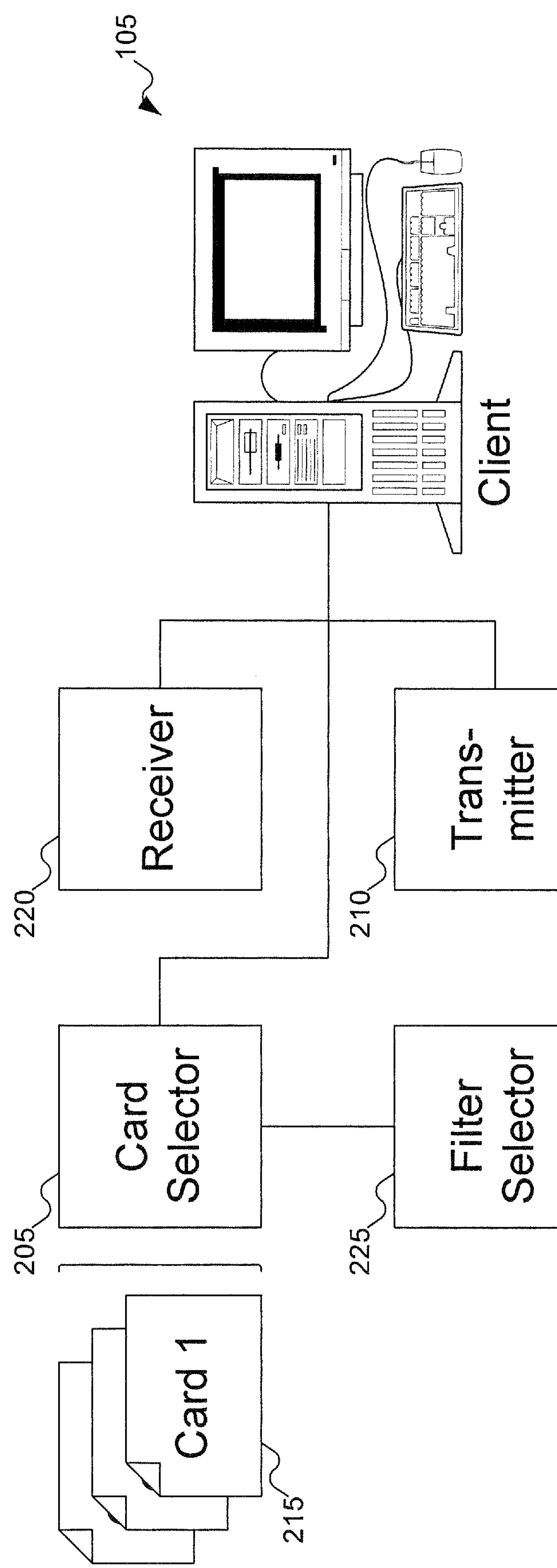
FIG. 2 shows a system designed to provide the ability to manage information cards, according to an embodiment of the invention.

Now that the problem—managing information cards—is understood, a solution to the problem can be explained. FIG. 2 shows a system to manage information cards on computer system 105, according to an embodiment of the invention. In FIG. 2, computer system 105 includes card selector 205, receiver 210, and transmitter 215. Card selector 205 is responsible for enabling a user to select information card 220 that satisfies the security policy. Receiver 210 is responsible for receiving data transmitted to computer system 105, and transmitter 215 is responsible for transmitting information from computer system 105. These components are the same as those found in computer system 105 as shown in FIG. 1.

To manage the information cards, card selector 205 includes filter selector 225. Filter selector 225 can be used to select filters to be used in identifying information cards that can be used in satisfying the security policy from the relying party. Filter selector 225 offers the user the ability to select any desired filter. Examples of filters that can be used are discussed below with reference to FIGS. 3-4.

Figure 3:
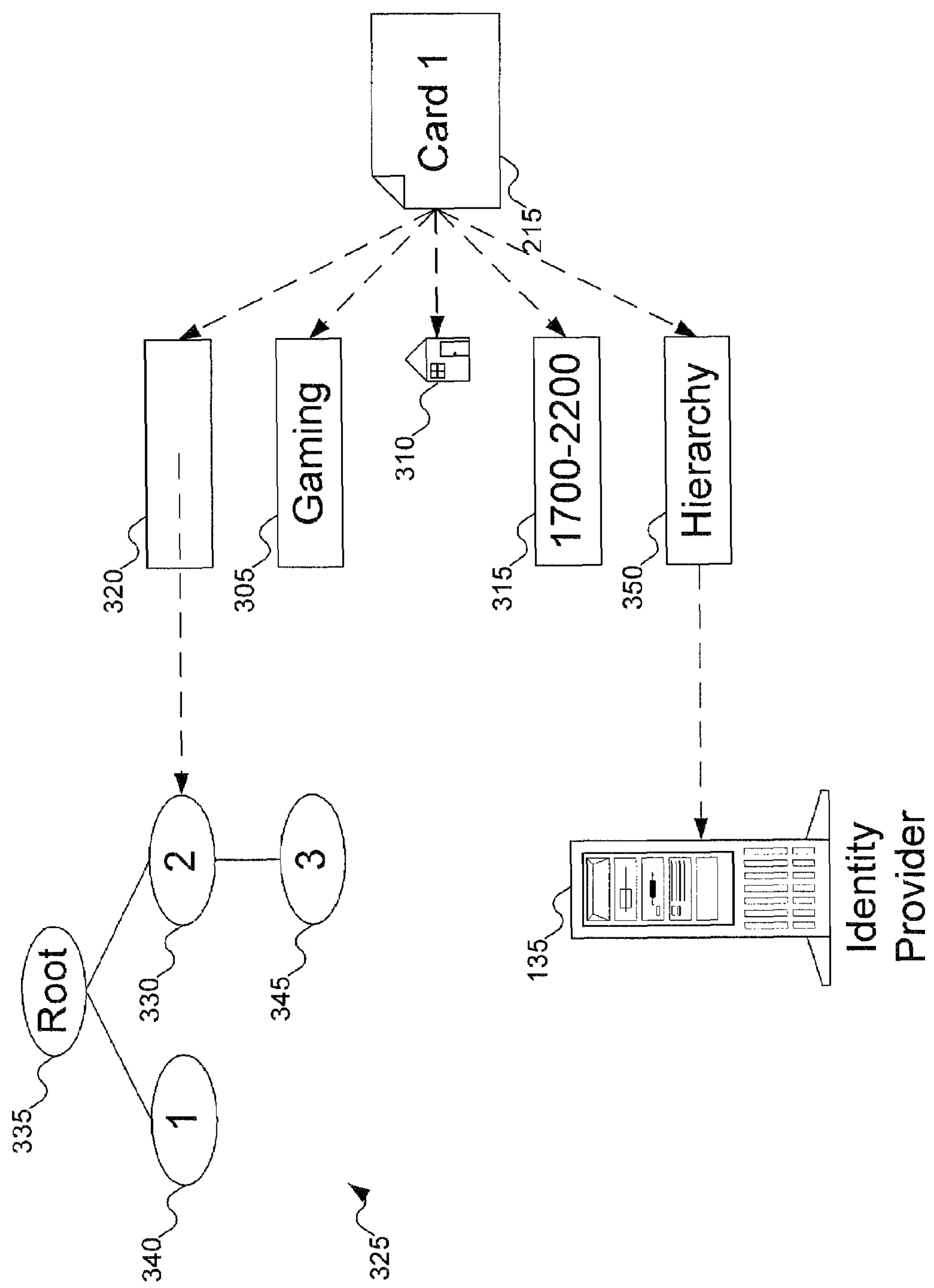
FIG. 3 shows examples of different types of metadata that can be associated with an information card in the system of FIG. 2.

FIG. 3 shows examples of different types of metadata that can be associated with an information card in the system of FIG. 2. In FIG. 3, information card 215 is shown. Assigned to information card 215 are a number of different types of metadata. String name 305 is a string that the user can assign to the information card. The user can then search for information cards with the associated string as a filter. The user can associate any desired strings (one or many) with a particular information card, and can associate the same string with multiple information cards.

Icon 310 is an iconic representation that can be associated with information card 215. In FIG. 3, icon 310 is a representation of a house, which can mean that the associated information card is used primarily used for personal reasons. Icons can be used to represent any desired filter: for example, work, personal, gaming, child, parent, financial, etc. Icons can be selected from a pre-defined set of graphics, or the user can add custom icons, either drawn from another location or newly created. The user can then specify a name to be associated with the icon, if desired: this information can be used to help remind the user of the icon's purpose. The user can then filter information cards based on the associated icons. A person skilled in the art will recognize that there can be any number of icons associated with a particular information card, and that the same icon can be associated with any number of information cards.

Policy 315 represents a policy that limits the use of the associated information card. Any desired policy can be used, without limitation. For example, policy 315 specifies a time range during which information card 215 is available. Policy 315 indicates that information card 215 is available between 5:00 PM and 10:00 PM. Such a policy might be applied by a parent to an information card used by a child (for example, to authenticate the child to their MySpace account). While policy 315 specifies just a time range, a person skilled in the art will recognize that policy 315 can be more complicated, if desired. For example, policy 315 could specify different time ranges for different days (for example, prohibiting use of information card 215 after 8:00 PM on weeknights, but permitting the child to use information card 215 during most hours of the weekend). Or policy 315 could permit use of information card 215 on certain days at all hours, but deny use of information card 215 on other days.

A person skilled in the art will also recognize that policy 315 can be defined specifically for information card 215, or it can be defined in the abstract and then specifically associated with information card 215. For example, a data structure can store the policy (in FIG. 3, limiting use of information card 215 to the hours of 5:00 PM and 10:00 PM); the data structure can then be associated with information card 215 and any other information cards, as desired. Examples of how policies can be defined and stored are described in co-pending U.S. patent application Ser. No. 11/768,755, filed Jun. 26, 2007, and co-pending U.S. patent application Ser. No. 12/323,177, filed Nov. 25, 2008, which are incorporated by reference herein. While co-pending U.S. patent application Ser. No. 11/768,755, filed Jun. 26, 2007, describes policies that can be used in authorizing access to resources, a person skilled in the art will recognize that information card 215 can be considered a form of resource, and policy 315 can be a control on the authorized use of information card 215.

Between co-pending U.S. patent application Ser. No. 11/768,755, filed Jun. 26, 2007, and co-pending U.S. patent application Ser. No. 12/323,177, filed Nov. 25, 2008, a person skilled in the art will recognize numerous different forms policy 315 can take. For example, policy 315 might specify that before a user is permitted to use information card 215, such use must be confirmed by a third party: a parent might want to know each time a child logs into his or her MySpace account, In that case, policy 315 would specify that the parent needs to be informed in-line of the attempt to log in and provide authorization before login is completed. This is similar to the audit capability described in co-pending U.S. patent application Ser. No. 12/323,177, filed Nov. 25, 2008, but interposes the in-line audit capability before the information card can even be selected (an earlier point in the process than the audit capability).

As discussed above, a person can associate the same policy with multiple information cards. The user can also associate multiple policies with an individual information card. For example, a user might choose to establish one policy that applies to an information card during working hours, and another policy that applies to an information card during off hours. If the policies are identified in some manner (e.g., by names or some other description), the user can filter information cards based on policies.

Container 320 identifies a container with which information card 215 is associated. Information cards, like any other object in the computer system, can be stored somewhere on some storage of the computer system. The storage itself can be any desired form of storage: for example, a hard drive, a floppy disk, an optical disc (such as a compact disc (CD) or digital video disc (DVD)), flash memory, among other possibilities.

As with most computer systems, containers can be organized in a container hierarchy. Container hierarchy 325 is an example of such a container hierarchy. Different containers can be used to organize the contents of the folders. For example, in the Microsoft Windows operating system, a folder named Windows is often used to store the files that make up the operating system, using subfolders to store various components of the operating system. In a similar manner, container hierarchy 325 can be used to organize information cards into different containers. The user can select a particular container in which to store a particular information card. In FIG. 3, the user has associated information card 215 with container 330, as shown by container 320. The user could instead have chosen to associate information card 215 with any of containers 335, 340, or 345.

In the above description, the terms "folder" and "container" are both used. In this specification, a folder can be a form of container. But a person skilled in the art will recognize that containers can be structured in forms other than folders, if desired.

Although FIG. 3 suggests that an information card can be associated with only one container, embodiments of the invention are not so limited. A single information card can be associated with any number of containers, if desired. One way to achieve this would be to store the information card in one container and then link that information card into other containers, but a person skilled in the art will recognize other ways in which an information card can be associated with multiple containers.

One reason to use containers is to take advantage of containers that nest. For example, in container hierarchy 325, container 345 is nested within container 330 and containers 330 and 340 are both nested within container 335. (This has the added implication that container 345 is also nested within container 335.) Nesting containers does not mean that the contents of the nested container are directly stored within the outer container, but the contents can be considered part of the "hierarchy" of that outer container. For example, an object stored in container 340 is not in the hierarchy starting at container 330, but an object stored in container 345 is in the hierarchy of container 330. As a result, using a container as a filter enables locating not only objects stored directly in that container, but also objects nested within the container. For example, using container 330 as a filter would identify information card 215 based on its association with container 330, but could also identify information cards associated with container 345. (Whether a filter based on a container also identifies information cards associated with sub-containers can be an option that the user can control.)

Finally, hierarchy 350 enables filtering based on fields in the information cards. For example, identity provider 135, which stores the details (that is, the actual data) about information card 215, can store information card 215 in a hierarchical storage. The hierarchy used to store information card 215 can be used to filter information cards, in a manner similar to the containers in container hierarchy 325. But whereas container hierarchy 325 is stored on the user's computer system, hierarchy 350 is stored on identity provider 135 (or some other system separate from the user's computer system). Any folder in the hierarchy can be used to filter information cards, and as with container hierarchy 325, the selected folder can filter just information cards stored in that folder, or the selected folder can filter all information cards stored or nested in that container.

As mentioned above, in FIG. 3 one of each type of metadata is shown as associated with information card 215. A person skilled in the art will recognize that any number of each type of metadata can be associated with an individual information card, including zero. Thus, an information card might have three string names associated with it, one container associated with it, and no icons, policies, or hierarchies.

Figure 4:
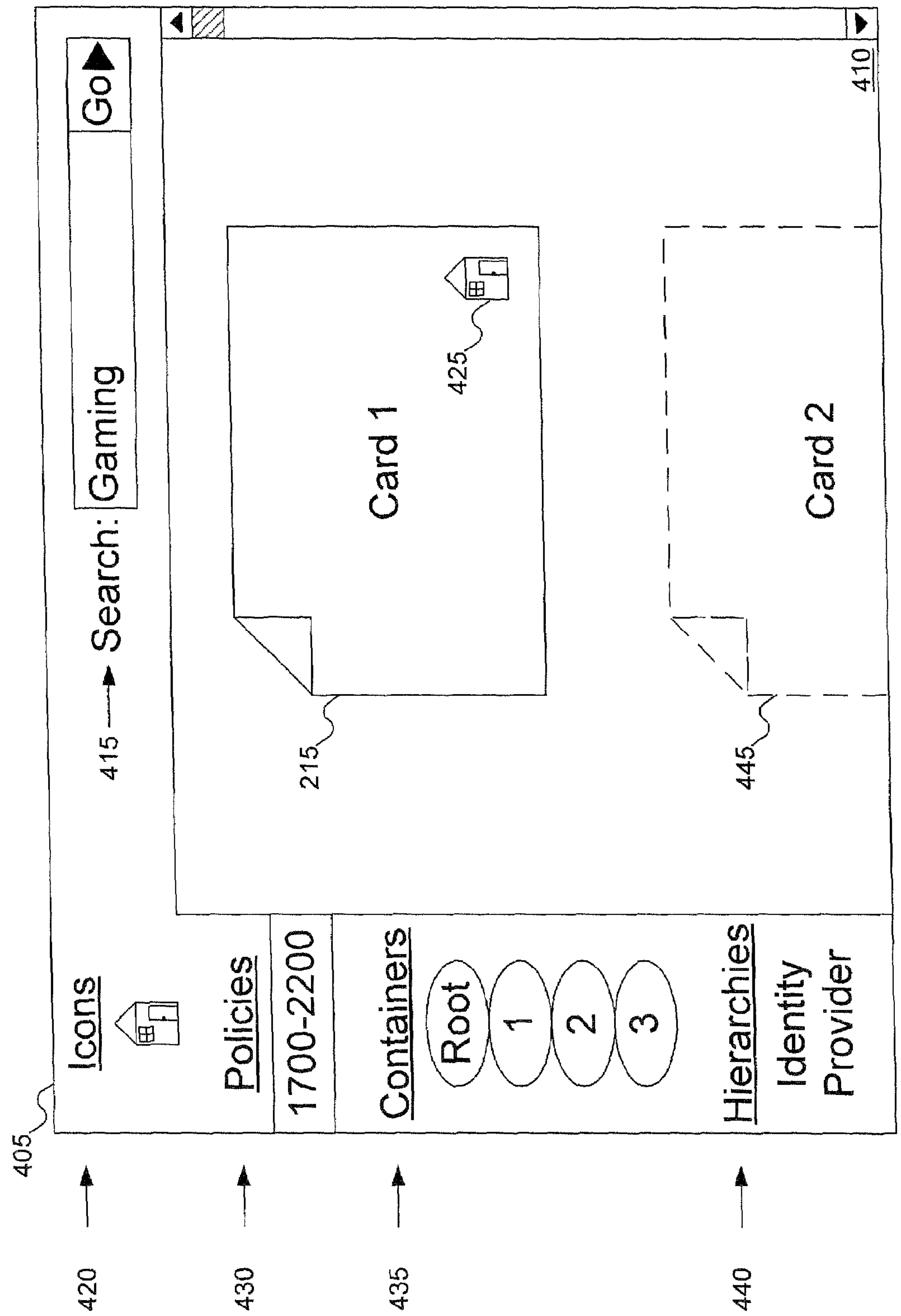
FIG. 4 shows a graphic display for use in managing information cards in the system of FIG. 2.

FIG. 4 shows a graphic display for use in managing information cards in the system of FIG. 2. In FIG. 4, display 405 is shown. In the main part 410 of display 405, the information cards can be displayed. Surrounding main part 410 are various filter options the user can use. Search field 415 enables a user to input a search string—in FIG. 4, the entered search string is "Gaming". Search field 415 enables filtering based on string names.

Icon section 420 provide the user with options to filter based on icons. In FIG. 4, icon section 420 only shows a single icon, but as discussed above with reference to FIG. 3, if the user has used more than one icon, the available filter icons can be shown in icon section 420. (Alternatively, all icons can be shown in icon section 420, even if not used; in that situation, the unused icons can be grayed out, so that the user is aware as to which icons would make a difference to the results).

One alternative shown to using icon section 420 is to display the icons directly on the information cards, as shown by icon 425 on information card 215. While this embodiment is shown only with reference to icons, a person skilled in the art will recognize that the other filter options can also be displayed directly on the information cards. A person skilled in the art will also recognize that where filter options are displayed directly on the information cards, the corresponding filter option sections can be removed from display 405, if desired.

Policy section 430 enables the user to filter based on policies. As with icon section 420, only policies that would affect the filtering results can be shown, or all policies can be included with unused policies grayed out, among other possibilities.

Container section 435 enables the user to filter based on containers. As with icon section 420 and policy section 430, only containers that would affect the filtering results can be shown, or all containers can be included with unused containers grayed out, among other possibilities. For example, if information cards are only associated with one container and the user opts to filter based on container 2, the entry for container 1 would not affect the results, so that entry could be grayed out. But if information cards can be associated with multiple containers, then there might be an information card associated with both containers 1 and 2, and so the user's selecting container 2 would not necessarily mean that selecting container 1 would make no difference.

Hierarchy section 440 enables the user to filter based on hierarchy information. As discussed above with FIG. 3, the hierarchy can depend on where the actual data for the information card is stored. Hierarchy section 440 can operate in a manner similar to that of icon section 420, policy section 430, and container section 435, in that hierarchy selections that would not make a difference can be removed or grayed out, as desired.

The various filter options (search field 415, icon section 420, policies section 430, container section 435, and hierarchy section 440) can be combined in any manner desired. For example, the filter options can be combined disjunctively (where an information card that satisfies any of the filter options is included) or conjunctively (where an information card that satisfies all of the filter options is included). FIG. 4 does not show the user being able to control whether filter options combine disjunctively or conjunctively, but a person skilled in the art will recognize how this functionality can be added. In addition, other filter options can be added if desired. For example, display 405 could include a "No Filters" button, which could be used to remove all enabled filters responsive to a single action by a user. A person skilled in the art will recognize other ways in which filter options can be modified.

Once the user has identified the filter options, main part 410 displays or otherwise identifies the information cards that satisfy the filter options. For example, information card 215 meets the filter options, and so is shown in main part 410 of display 405. In contrast, information card 445 does not meet the filter options, and so can be grayed out (shown by the dashed line to information card 445). A person skilled in the art will also recognize that information card 445, as not meeting the filter options, can simply be omitted from main part 410.

While FIG. 4 suggests that filters can be applied, perhaps at different times, a person skilled in the art will also recognize that filters can be "unapplied": that is, removed. For example, if the user decides that search filter for the term "gaming" does not help identify the desired information card, the user can remove that filter option, thereby broadening the filter. In a similar manner, the other filter sections can be applied and "unapplied" as desired.

Figure 5:
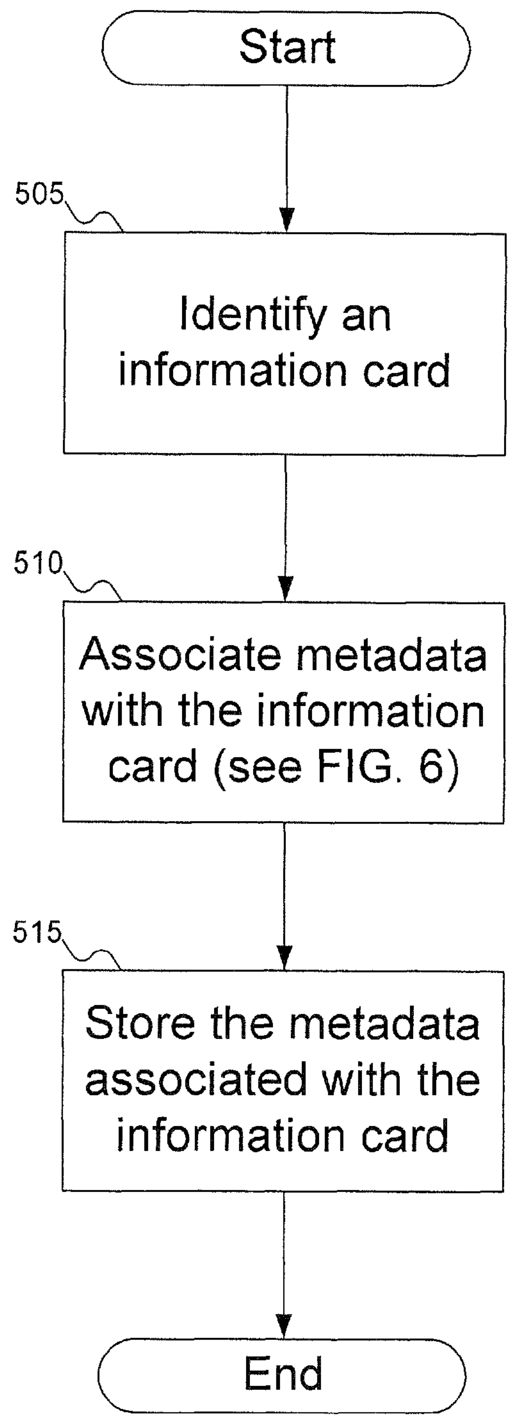
FIG. 5 shows a flowchart of a procedure for associating metadata with an information card in the system of FIG. 2.

FIG. 5 shows a flowchart of a procedure for associating metadata with an information card in the system of FIG. 2. At block 505, the user identifies an information card. At block 510, the user identifies metadata, which is associated with the information card. At block 515, the metadata is stored, associated with the information card.

Figure 6:
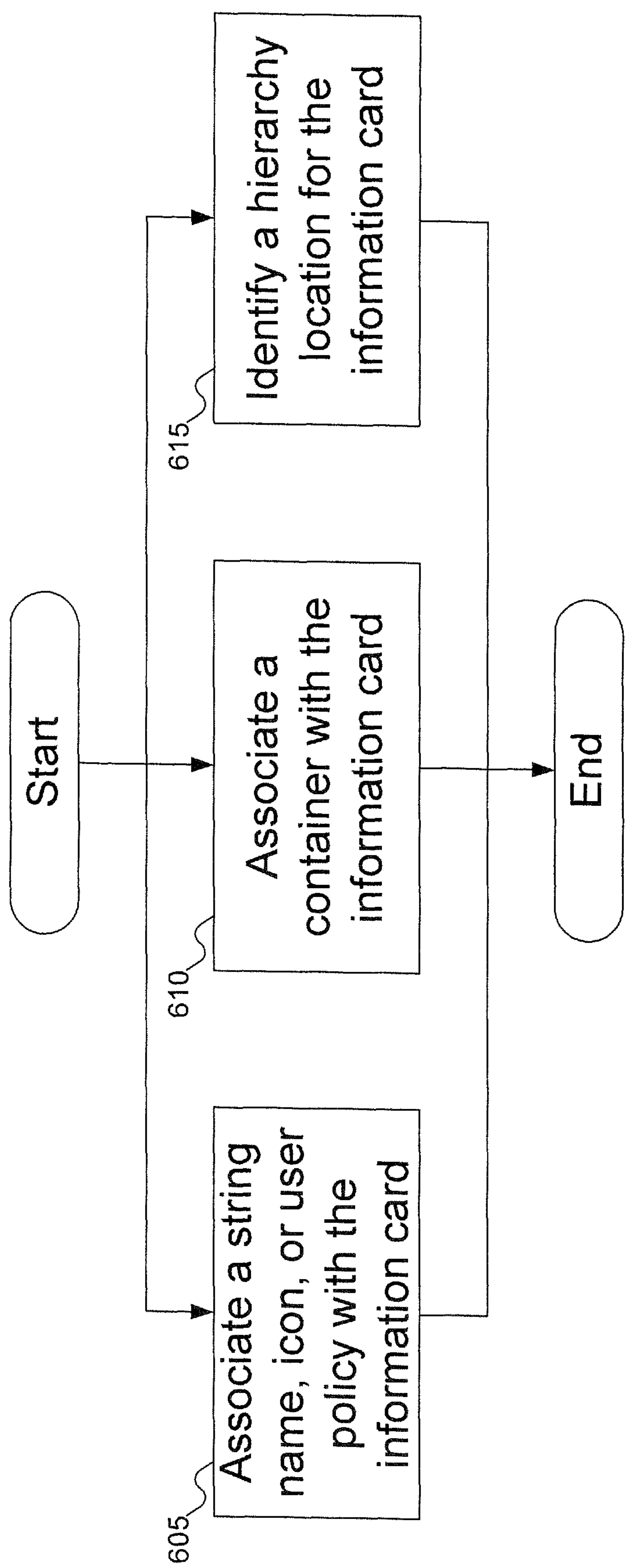
FIG. 6 shows a flowchart of different procedures for associating particular types of metadata with an information card in the system of FIG. 2.

FIG. 6 shows a flowchart of different procedures for associating particular types of metadata with an information card in the system of FIG. 2. At block 605, the system can associate a string name, an icon, or a policy with the information card. At block 610, the system can associate a container with the information card. And at block 615, the system can associate a hierarchy with the information card.

Figure 7A:
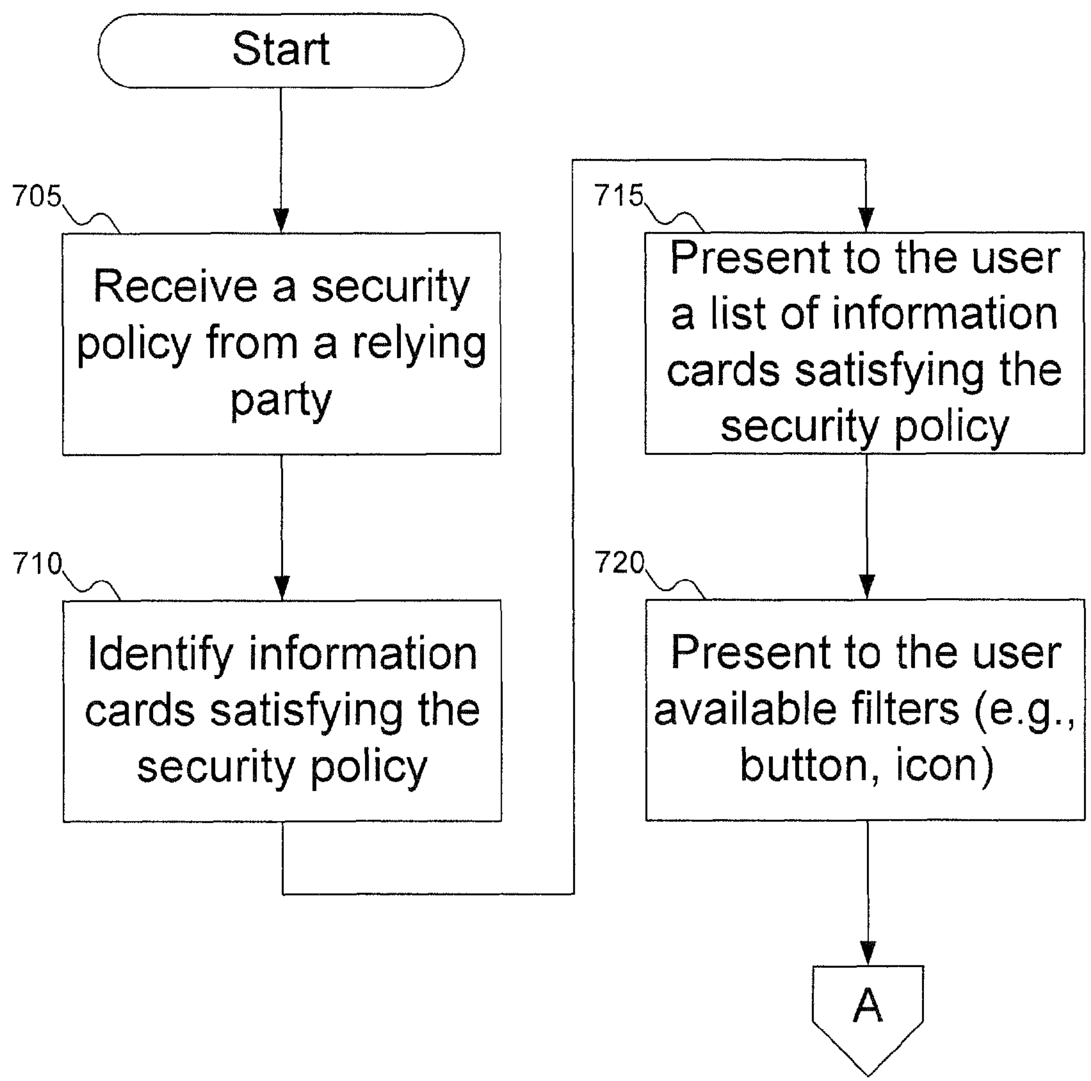
FIGS. 7A-7B show a flowchart of a procedure for managing information cards in the system of FIG. 2.
Figure 7B:
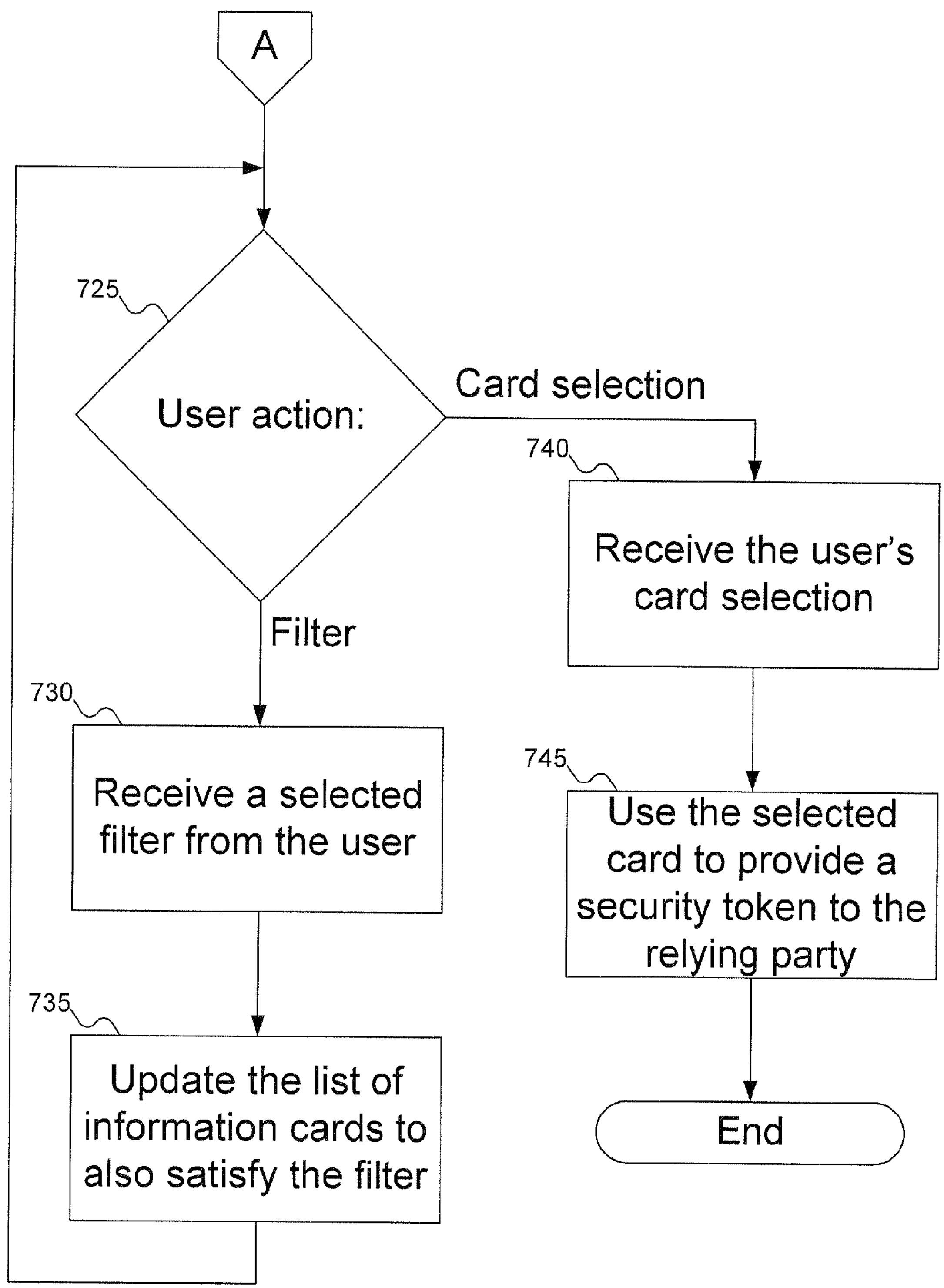

FIGS. 7A-7B show a flowchart of a procedure for managing information cards in the system of FIG. 2. In FIG. 7A, at block 705, the system receives a security policy from a relying party. At block 710, the system identifies information cards that satisfy the security policy. At block 715, the system presents to the user an initial list of information cards that satisfy the security policy. At block 720, the system presents to the user the available filters. As discussed above with reference to FIG. 4, the available filters might be limited to just filters that can affect the list of available information cards, or the available filters can include all filters.

At block 725 (FIG. 7B), the system determines the user's choice of action. If the user has opted to change the filter options (either by narrowing or broadening the filter), then at block 730, the system receives from the user the selected filter change. At block 735, the system updates the list of information cards to those that also satisfy the selected filter. This can also include updating the available filters, as discussed above with reference to FIG. 4. Control then returns to block 725.

If the user selects an information card, then at block 740, the system receives the user's card selection, and at block 745, the system uses the selected information card in satisfying the relying party's security policy.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention may be described by reference to or in conjunction with associated data including functions, procedures, data structures, application programs, instructions, etc. which, when accessed by a machine, result in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus to manage information cards, comprising:

a computer;

storage on the computer;

at least one information card stored in the storage on the computer;

metadata associated with the at least one information card that is stored in the storage on the computer, the metadata specified by a user;

a card selector operative to identify the at least one information card as satisfying a security policy; and a filter selector to allow the user to select a user-specified filter for the at least one information card, the user-specified filter using the metadata associated with the at least one information card; wherein the filter selector reduces the number of information cards that satisfy the security policy displayed to the user;

wherein the card selector is operative to identify the at least one information card as satisfying both the security policy and the user-specified filter;

wherein metadata associated to the information card includes metadata associating the information card with at least one of a plurality of identifiers of a plurality of containers.

2. An apparatus according to claim 1, wherein the metadata includes at least one item drawn from a set including a string name, an icon, and a user policy to the information card.

3. An apparatus according to claim 1, wherein the metadata includes at least one of a plurality of identifiers of a plurality of containers.

4. An apparatus according to claim 1, wherein the metadata includes a hierarchy of information cards.

5. An apparatus according to claim 1, wherein the card selector is operative to enable the user to select the at least one information card satisfying the security policy and the user-specified filter.

6. A method for managing information cards, comprising:

identifying an information card;

associating metadata to the information card stored on a computer;

storing the metadata associated with the information card;

receiving a security policy from the relying party;

receiving from a user a user-specified filter using the metadata associated with the information card; wherein the user-specified filter reduces the number of information cards displayed to the user;

selecting the information card for display to the user when the information card satisfies the security policy 4404 and the user-specified filter; and presenting to the user the information cards that satisfy both the security policy and the user-specified filter;

wherein associating metadata to the information card includes associating the information card with at least one of a plurality of identifiers of a plurality of containers.

7. A method according to claim 6, further comprising:

receiving from the user a selected information card that satisfies both the security policy and the user-specified filter; and using the selected information card to provide a security token to the relying party responsive to the security policy.

8. A method according to claim 6, wherein receiving from a user a user-specified filter includes presenting the user a graphic display of available user-specified filters.

9. A method according to claim 8, wherein receiving from a user a user-specified filter further includes receiving from the user an indication of one the available user-specified filters.

10. A method according to claim 6, wherein:

the method further comprises presenting to the user a list of information cards satisfying the security policy; and receiving from a user a user-specified filter further includes updating the list of information cards presented to the user to include information cards satisfying both the security policy and the identified user-specified filter

11. A method according to claim 8, wherein presenting to the user a graphic display of available user-specified filters includes displaying an icon for the user-specified filter with the information card.

12. A method according to claim 6, wherein associating metadata to the information card includes associating at least one item from a set including a string name an icon and a user policy to the information card.

13. A method according to claim 6, wherein associating metadata to the information card includes identifying a location for the information card in a hierarchy of information cards.

14. An article, comprising a non-transitory storage medium, said non-transitory storage medium having stored thereon instructions that, when executed by a machine, result in:

identifying an information card;

associating metadata to the information card;

storing the metadata associated with the information card;

receiving a security policy from the relying party;

receiving from a user a user-specified filter using the metadata associated with the information card wherein the user-specified filter reduces the number of information cards displayed to the user;

selecting the information card for display to the user when the information card satisfies the security policy and the user-specified filter; and presenting to the user the information cards that satisfy both the security policy and the user-specified filter;

wherein associating metadata to the information card includes associating the information card with at least one of a plurality of identifiers of a plurality of containers.

15. An article according to claim 14, wherein said non-transitory storage medium has stored thereon further instructions that, when executed by said machine, result in:

receiving from the user a selected information card that satisfies both the security policy and the user-specified filter; and using the selected information card to provide a security token to the relying party responsive to the security policy.

16. An article according to claim 14, wherein receiving from a user a user-specified filter includes presenting to the user a graphic display of available user-specified filters.

17. An article according to claim 16, wherein receiving from a user a user-specified filter further includes receiving from the user an indication of one the available user-specified filters.

18. An article according to claim 14, wherein:

the method further comprises presenting to the user a list of information cards satisfying the security policy; and receiving from a user a user-specified filter further includes updating the list of information cards presented to the user to include information cards satisfying both the security policy and the identified user-specified filter.

19. An article according to claim 16, wherein presenting to the user a graphic display of available user-specified filters includes displaying an icon for the user-specified filter with the information card.

20. An article according to claim 14, wherein associating metadata to the information card includes associating at least one item from a set including a string name, an icon, and a user policy to the information card.

21. An article according to claim 14, wherein associating metadata to the information card includes associating the information card with at least one of a plurality of identifiers of a plurality of containers.

22. An article according to claim 14, wherein associating metadata to the information card includes identifying a location for the information card in a hierarchy of information cards.

23. An apparatus according to claim 4, wherein the hierarchy of information cards is stored remote from the computer.

24. A method according to claim 13, wherein identifying a location for the information card in a hierarchy of information cards includes identifying the location for the information card in the hierarchy of information cards, the hierarchy of information cards stored remote from the computer.

25. An article according to claim 22, wherein identifying a location for the information card in a hierarchy of information cards includes identifying the location for the information card in the hierarchy of information cards, the hierarchy of information cards stored remote from the computer.

26. An apparatus according to claim 2, wherein the metadata does not include data that can be included as a claim in a security token.

27. A method according to claim 12, wherein associating metadata to the information card includes associating metadata to the information card, where the metadata does not include data that can be included as a claim in a security token.

28. An article according to claim 20, wherein associating metadata to the information card includes associating metadata to the information card, where the metadata does not include data that can be included as a claim in a security token.

29. An apparatus according to claim 3, wherein the plurality of container are stored on the computer.

30. A method according to claim 6, wherein associating metadata to the information card further includes storing the information card in a container identified by the at least one of a plurality of identifiers.

31. An article according to claim 21, wherein associating metadata to the information card further includes storing the information card in a container identified by the at least one of a plurality of identifiers.

* * * * *